Nov. 1, 1938.   K. A. KILLAM   2,135,308
VERTICAL LABYRINTH BEARING
Filed Aug. 12, 1937

Inventor:
Kenneth A. Killam,
by Harry E. Dunham
His Attorney.

Patented Nov. 1, 1938

2,135,308

UNITED STATES PATENT OFFICE 2,135,308

VERTICAL LABYRINTH BEARING

Kenneth A. Killam, Fort Wayne, Ind., assignor to General Electric Company, a corporation of New York Application August 12, 1937, Serial No. 158,691

1 Claim. (Cl. 308—36.4)

My invention relates to bearings, and more particularly to vertical labyrinth bearings.

One object of my invention is to provide an improved vertical self-lubricating labyrinth bearing.

For a better understanding of my invention, together with further objects and advantages thereof reference is had to the following description, taken in connection with the accompanying drawing, and its scope will be pointed out in the appended claim.

Figure 1:
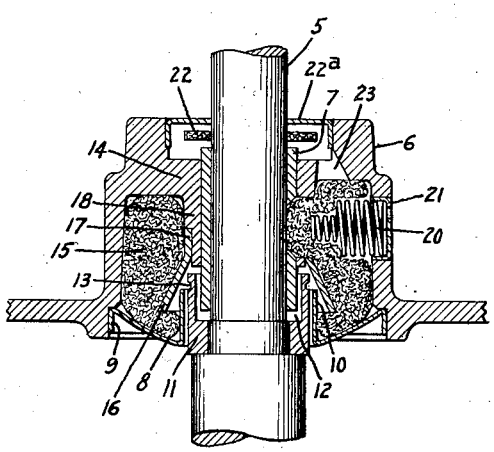
Figure 2:
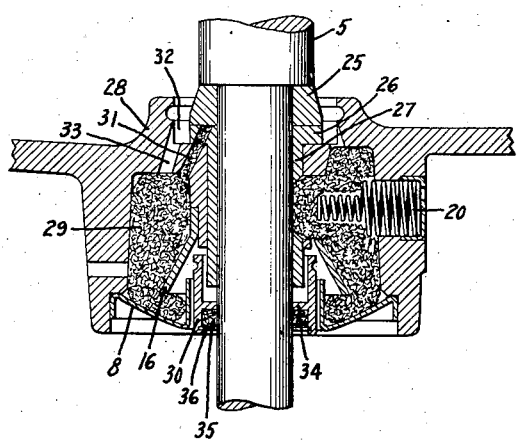

In the accompanying drawing, Fig. 1 illustrates a cross-sectional front elevation of a vertical guide bearing built in accordance with my invention; and Fig. 2 is a vertical cross-sectional view of a thrust bearing built in accordance with my invention.

Referring to the drawing in detail, Fig. 1 discloses a bearing for a shaft 5 comprising a bearing housing 6 and a bearing sleeve 7 mounted therein. The bearing housing is closed at its lower end by a conical cap 8 provided with an outer flange 9, frictionally engaging the inner surface of the bearing housing 6, and is provided at its inner edge with an upwardly projecting flange 10 comprising a stand-pipe which due to the conical shape of the cap forms an oil reservoir of the cap 8. An oil thrower 11 frictionally engaging the shaft 5 is arranged between the shaft and the stand-pipe 10, overlapping the lower end of the bearing sleeve 7 and projecting above the end of the stand-pipe 10. The oil thrower 11 is a cylindrically shaped member which fits tightly against the shaft 5 for a portion of its length and is spaced from the shaft for the rest of its length, thereby forming an annular space 12 between itself and the shaft. The bearing sleeve 7 projects into this annular space and any oil flowing down past the end of the sleeve is stored in this space until it is thrown outwardly by centrifugal force during the operation of the motor. An oil groove 13 is provided on the outer surface and near the upper edge of the oil thrower for the purpose of preventing any oil from creeping down the outer side thereof.

The space within the bearing housing 6, bounded at one end by a wall 14, projecting horizontally from the bearing housing, and at the other end by the cap 8 is filled by oil soaked wool, or some similar fibrous material 15 which absorbs and holds in suspension nearly all of the oil in the housing. The oil in the wool is held in suspension by capillary action, but sufficient oil is provided so that some free oil collects in the cap 8. The oil which collects in the oil thrower 11 is thrown across the space between itself and the flange 10 upon the surface of a deflector 16. The deflector 16, shaped like a truncated cone is provided at its upper end with a collar 17, by means of which it is attached to the housing sleeve 18. The angle of the deflector surface is such that it clears the upper ends of the oil thrower and flange 10 and holds the wool away from the oil thrower 11. The oil thrown off the edge of the oil thrower 11 passes across the space between the thrower 11 and the flange 10 and impinges upon the inner surface of the deflector from which it flows into the reservoir in cap 8. The deflector 16, therefore, performs the double function of spacing the oil soaked wool from the oil thrower and guiding the oil thrown from the thrower back to the reservoir. A spring 20 held in the housing by a cap 21 forces the wool against the shaft surface through an opening in the sleeve 7.

In operation, the oil in the wool 15 is distributed over the shaft surface 5, some of it flowing downwardly into the oil thrower 12, from which it is thrown out by centrifugal action against the surface of the deflector 16, and from there, returns to the wool 15. A similar flow takes place by capillary action upwardly to the end of the bearing sleeve 7. Above the end of the sleeve 7 a washer 22 is pressed onto the shaft 5. This washer may be leather or cork, but is preferably an oil resistant rubber compound. It is located on the shaft above the end of the bearing sleeve 7 and below the end of the bearing housing. The end of the bearing housing is closed by a metal cap 22a which is pressed into the end of the housing 6. The washer rotates with the shaft and the oil which may tend to creep along the shaft 5 is thrown off the washer and returns to the wool 15 through a hole 23 in the wall 14. The washer 22 may be omitted in some applications in which case, the oil exudes from the top end of the bearing and returns through a hole 23 in the wall 14. This operation is continuous throughout the rotation of the shaft 5, and provides a continuous lubrication of the vertical bearing. In view of the arrangement of the oil thrower and stand-pipe, no oil reaches the outer surface of the shaft 5 below the bearing.

In Fig. 2, the lower end of the shaft 5 is disclosed as being supported by a thrust bearing. The shaft 5 is provided with a thrust collar 25 having a horizontal surface butting against the thrust flange 26 of a bearing sleeve 27. In the bearing housing 28, wool 29 is held by a cap 8, and an oil thrower 30, which is a slight modification of the oil thrower 11, throws oil against the surface of the deflector 16. Oil from the wool reaches the bearing surface between the collar 25 and the flange 26 through an oil hole 31, which is provided with an oil wick; however, the greater supply of oil is up through the bearing bore. Any oil thrown out from this surface is thrown into an oil receiving reservoir 32, and flows to the wool 29 through a hole 33. The bearing sleeve 27 may be made of a porous material, in which case, the wick may be omitted. The wool 29 is pressed against a shaft through a hole in the sleeve 27 by a spring 29. The circulation of the oil in this bearing during operation is practically the same as already explained for Fig. 1.

The oil thrower 30 differs from the oil thrower 11 in that it is supported only by a web 34 which is tightly fitted to the shaft outside of the journal surface, and there is no shoulder on the shaft to reinforce it. In order to guard against any oil escaping past the web 34, therefore, a resilient washer 35 of leather, cork, or rubber compound is provided in a circular cavity at the lower end of the thrower and is held in place by a washer 36, which is riveted to the lower edge of the thrower, thus making an assembly which is slipped on to the shaft after the shaft has been passed through the bearing sleeve.

What I claim as new and desire to secure by Letters Patent of the United States, is:

In a self-lubricating vertical shaft bearing the combination of a bearing housing, a bearing sleeve mounted therein, an oil throwing cup overlapping the end of said sleeve, a packing in said housing between said oil thrower and the wall of said housing, a reservoir at the lower end of said housing provided with a reentrant sleeve spaced from and concentric with said oil thrower, and a conical deflector attached to the bearing housing and extending across the space between said oil thrower and reentrant sleeve into said oil reservoir whereby said deflector separates said packing from said oil thrower and simultaneously reconducts oil thrown off by said oil thrower to the said reservoir.

KENNETH A. KILLAM.